(12) United States Patent
Garrett

(10) Patent No.: US 10,070,593 B2
(45) Date of Patent: Sep. 11, 2018

(54) GREEN HORTICULTURAL THERAPY APPARATUS

(71) Applicant: Terry N. Garrett, Athens, TN (US)

(72) Inventor: Terry N. Garrett, Athens, TN (US)

( * ) Notice: Subject to any disclaimer, the term of this patent is extended or adjusted under 35 U.S.C. 154(b) by 137 days.

(21) Appl. No.: 14/840,754

(22) Filed: Aug. 31, 2015

(65) Prior Publication Data

US 2015/0366143 A1   Dec. 24, 2015

Related U.S. Application Data

(63) Continuation-in-part of application No. 13/560,670, filed on Jul. 27, 2012, which is a continuation-in-part of application No. 12/872,791, filed on Aug. 31, 2010, which is a continuation-in-part of application No. 12/053,278, filed on Mar. 21, 2008.

(51) Int. Cl.
*A01G 9/02* (2018.01)
*A01G 9/14* (2006.01)
*A01G 9/16* (2006.01)

(52) U.S. Cl.
CPC .............. *A01G 9/02* (2013.01); *A01G 9/1423* (2013.01); *A01G 9/16* (2013.01); *Y02A 40/254* (2018.01)

(58) Field of Classification Search
CPC .......... A01G 9/02; A01G 9/16; A01G 9/1423; A01G 9/1476; A01G 9/24; A01G 25/02; A01G 9/28; A47G 7/041; A47G 7/042; A47F 7/0078
USPC ...................... 47/18, 39, 65.5, 66.3, 66.4, 68
See application file for complete search history.

(56) References Cited

U.S. PATENT DOCUMENTS

| 473,631 | A |   | 4/1892 | Loepere |
|---|---|---|---|---|
| 602,649 | A |   | 4/1898 | Wight |
| 780,627 | A | * | 1/1905 | Umbehend .............. A47G 7/07  47/41.11 |
| 784,756 | A |   | 3/1905 | Pult |
| 922,317 | A | * | 5/1909 | Nelson ..................... A01K 5/01  119/61.1 |
| 1,222,648 | A |   | 4/1917 | Marks |
| 1,405,568 | A | * | 2/1922 | Conklin ................. A47H 27/00  220/4.12 |
| 1,508,028 | A |   | 9/1924 | Robinson |
| 1,558,357 | A | * | 10/1925 | De Witt ............... A01G 27/005  47/39 |
| 1,764,543 | A | * | 6/1930 | Barton ..................... A01G 5/00  47/39 |
| 1,833,676 | A |   | 11/1931 | Gloekler |
| 1,874,207 | A |   | 8/1932 | Purplaw |
| 2,545,717 | A |   | 3/1951 | Voigt |
| 2,711,053 | A | * | 6/1955 | Dettmers, Sr. ........... A01G 9/16  47/66.1 |
| D236,569 | S | * | 9/1975 | Kramer ........................ D11/156 |
| 4,174,589 | A |   | 11/1979 | Daharsh |

(Continued)

FOREIGN PATENT DOCUMENTS

| GB | 2137464 | 10/1984 |
|---|---|---|
| GB | 2243524 | 11/1991 |

*Primary Examiner* — Kristen C Hayes
*Assistant Examiner* — Christopher D Hutchens
(74) *Attorney, Agent, or Firm* — Pitts & Lake, P.C.

(57) ABSTRACT

A horticultural therapy apparatus is accessible to a practitioner who occupies a wheelchair. The horticultural therapy apparatus presents a raised and stable working surface that can be easily accessed by a person in a wheelchair or by a person otherwise operating with impaired or limited mobility.

7 Claims, 9 Drawing Sheets

(56) References Cited

U.S. PATENT DOCUMENTS

| | | | | |
|---|---|---|---|---|
| 4,739,580 A * | 4/1988 | Simmons | ............. | A47B 3/0818 108/50.13 |
| 4,825,588 A | 5/1989 | Norman | | |
| 4,850,134 A | 7/1989 | Snekkenes | | |
| D335,265 S * | 5/1993 | Rush | ........................ | D11/145 |
| 5,228,229 A * | 7/1993 | Lindgren | ............... | A01G 9/028 108/24 |
| D366,226 S * | 1/1996 | Foutes | ........................ | D11/144 |
| 5,611,172 A | 3/1997 | Dugan et al. | | |
| 5,664,367 A | 9/1997 | Huang | | |
| 5,852,895 A | 12/1998 | Sinanan | | |
| D428,828 S | 8/2000 | Gutierez | | |
| 6,138,403 A | 10/2000 | Bartlett | | |
| 6,243,985 B1 | 6/2001 | Miller | | |
| 6,401,387 B1 * | 6/2002 | Diloreto | ................. | A01G 9/104 47/66.5 |
| 6,907,693 B1 * | 6/2005 | Bemben | ................... | A01G 9/00 47/65 |
| 7,036,270 B1 * | 5/2006 | Shepherd | ................. | A01G 9/16 211/74 |
| 7,735,800 B2 * | 6/2010 | Lunato | .................. | A47G 7/044 248/146 |
| 7,788,849 B1 * | 9/2010 | Cleveland | ................ | A01G 9/16 47/66.7 |
| 8,245,443 B1 * | 8/2012 | Caruso | ................... | A01G 9/023 211/85.23 |
| 8,320,752 B1 * | 11/2012 | Bergau | ..................... | A47J 31/46 222/108 |
| 8,904,706 B1 * | 12/2014 | Smith | ...................... | A01G 9/00 47/65.6 |
| 9,149,006 B1 * | 10/2015 | Pope | ...................... | A01G 9/027 |
| 2002/0059751 A1 | 5/2002 | Taylor | | |
| 2002/0073615 A1 * | 6/2002 | Johnson | ................... | A01G 9/02 47/66.6 |
| 2002/0088171 A1 * | 7/2002 | Shepherd | ................. | A01G 9/16 47/17 |
| 2002/0174600 A1 | 11/2002 | Reed | | |
| 2003/0084610 A1 * | 5/2003 | Yawney | ..................... | A01G 9/02 47/65.5 |
| 2011/0041397 A1 * | 2/2011 | Kamahara | ................ | A01G 9/14 47/17 |
| 2012/0085026 A1 * | 4/2012 | Morris | .................. | A01G 31/06 47/62 A |
| 2016/0128282 A1 * | 5/2016 | Halferty | .................. | A01G 9/04 47/71 |

* cited by examiner

GREEN HORTICULTURAL THERAPY APPARATUS

CROSS-REFERENCE TO RELATED APPLICATIONS

This application is a continuation-in-part of and claims priority to U.S. patent application Ser. No. 13/560,670, filed Jul. 27, 2012, which is a continuation-in-part of and claims priority to U.S. patent application Ser. No. 12/872,791, filed Aug. 31, 2010, which is a continuation-in-part of and claims priority to U.S. patent application Ser. No. 12/053,278, filed Mar. 21, 2008. The entire content of all the foregoing applications is incorporated by reference herein.

STATEMENT REGARDING FEDERALLY-SPONSORED RESEARCH OR DEVELOPMENT

Not Applicable

BACKGROUND OF THE INVENTION

1. Field of Invention

The present invention relates generally to a horticultural therapy apparatus. More particularly, the invention is directed toward an elevated vessel for use by persons with limited mobility and by persons in wheelchairs or other mobility devices.

2. Description of the Related Art

Gardening is recognized as beneficial occupational therapy for persons dealing with physical injuries or with impaired or limited mobility, as from a stroke, a neurodegenerative disease, damage to the spinal cord, or other conditions. However, traditional gardening techniques often involve procedures that present obstacles for persons with impaired or limited mobility. In particular, gardening procedures that involve the gardener operating at ground level present special difficulties for persons occupying wheelchairs. Accordingly, a need is felt for a horticultural therapy apparatus that presents a raised and stable working surface that can be easily accessed by a person in a wheelchair or by a person otherwise operating with impaired or limited mobility.

Planters are well known in the agricultural and gardening fields. Some planters known in the prior are, such as that described in U.S. Pat. No. 4,825,588 issued to Norman, include a central trough member supported by upstanding wall members. Plants are grown in a medium (usually soil) in the trough. By elevating the plants and media above the ground, the planter protects the plants from insects and ground animals, as well as from foot traffic and moderate flooding. Practitioners in the art have also found that use of a planter allows the practitioner more effectively and easily to control the composition and ingredients of the medium in which the plants are grown.

Planters offer particular advantages to those practitioners who occupy wheelchairs. If the planter is of proper elevation and is wheelchair-accessible, then the planter allows a practitioner who occupies a wheelchair to tend to the plants without having to bend or stoop. However, traditional planters are not designed for easy use by handicapped persons, particularly persons occupying wheelchairs. Thus, a need is felt for a planter that is designed to be wheelchair-accessible.

The incorporation of various structures onto the planter can further assist the wheelchair-bound practitioner and allow the practitioner more effectively and easily to control the conditions under which the plants grow and develop. For example, irrigation structures can supply the plants in the planter with controlled amounts of water at regular intervals; in this way an irrigation structure relieves the practitioner of the burden of manually watering the plants and of the risk of depending upon local weather conditions for irregular rain. Special lighting structures (hereinafter "grow lights") can illuminate the plants, supplying the light necessary for photosynthesis. Heaters can help maintain the ambient temperature within the planter, insulating the plants from cold weather.

Adding some or all of these structures to a planter increases the degree of control that the practitioner exercises over the conditions under which the plants grow. Adding some or all of these structures is also of benefit to a wheelchair-bound practitioner, as the wheelchair-bound practitioner may find it more difficult to perform personally some of the tasks (such as watering plants) accomplished by these structures. However, ordinarily the addition of irrigating, illuminating, or heating structures requires specialized modification of the planter. In other words, these structures are standard components of most planters, and most planters are not designed with a view to incorporating these structures. Additionally, the specialized modification of a planter to incorporate these structures can be expensive.

Other devices have been developed to address these and other problems. Typical of the art are those devices disclosed in the following U.S. patents:

| Patent Number | Inventor(s) | Date |
| --- | --- | --- |
| 473,631 | Loepere | Apr. 26, 1892 |
| 602,649 | Wight | Apr. 19, 1898 |
| 784,756 | Pult | Mar. 14, 1905 |
| 1,222,648 | Marks | Apr. 17, 1917 |
| 1,405,568 | Conklin | Feb. 7, 1922 |
| 1,508,028 | Robinson | Sep. 9, 1924 |
| 1,833,676 | Gloekler | Nov. 24, 1931 |
| 1,874,207 | Purplaw | Aug. 30, 1932 |
| 2,545,717 | Voigt | Mar. 20, 1951 |
| 4,174,589 | Daharsh | Nov. 20, 1979 |
| 4,739,580 | Simmons et al. | Apr. 26, 1988 |
| 4,825,588 | Norman | May 2, 1989 |
| 4,850,134 | Snekkenes | Jul. 25, 1989 |
| 5,611,172 | Dugan et al. | Mar. 18, 1997 |
| 5,664,367 | Huang | Sep. 9, 1997 |
| 5,852,895 | Sinanan | Dec. 29, 1998 |
| 6,138,403 | Bartlett et al. | Oct. 31, 2000 |
| 6,243,985 | Miller | Jun. 12, 2001 |
| 6,401,387 | Diloreto et al. | Jun. 11, 2002 |
| 7,036,270 | Mekler et al. | May 2, 2006 |
| Des. 428,828 | Gutierrez | Aug. 1, 2000 |
| GB 2,137,464 | Mekler et al. | Oct. 10, 1984 |
| GB 2,243,524 | Moffet | Nov. 6, 1991 |

Of these patents, the '568 patent issued to Conklin describes a trough-shaped box. This trough-shaped box is composed of a piece of sheet metal bent at its ends partly around two circular wooden discs, which form the end walls of the trough. The box is secured to the wooden discs by screws or other suitable fasteners.

The '588 patent issued to Norman describes an apparatus and method of manufacture wherein a corrugated fiberglass trough is sealed between matching end walls, said walls consisting of stand and plug members which have sealing surfaces which match the contour of the fiberglass trough.

The '367 patent issued to Huang discloses an artistic flower planting case hangable on a building terrace having a flower planting case and a hanging plate. The hanging plate is channel shaped and placed on an upper surface of a terrace wall of a building. The flower planting case is an elongated case with an upper open side, forming an interior for soil and flowers. The case is assembled with the hanging plate by bolts screwing into a plurality of threaded holes in a rear side of the flower planting case and a front side of the hanging plate.

The '895 patent issued to Sinanan describes a planter assembly that includes a planter box and a support structure for the planter box. The support structure is formed by an elevating post, a base beneath the post and a planter box support atop the post. The post is releasably secured within the support structure which enables height adjustment trimming and then refitting of the post with the support structure.

The '828 design patent issued to Gutierrez describes a modular planter.

The '985 patent issued to Miller describes an automatic watering system. The device of the 985 patent includes a variety of interconnecting parts to form one or more separate elongate trays which are arrange in any fashion but generally one above the next. Each linear or radial tray section is adapted for supporting one or more potted plants. Trays are interconnected by flexible tubes so that when water is introduced into an upper tray it flows downwardly into subsequent lower trays. Trays are inexpensively fabricated by an extrusion process and when attached at both ends to end sections, form a finished shelf into which water may be introduced so as to hydrate and feed the plants by root absorption. The end sections are held in place by a snap on cover which also engages a screen to provide an effective watering tray and a clog free system.

BRIEF SUMMARY OF THE INVENTION

A horticultural therapy apparatus is disclosed. In many embodiments, the apparatus comprises a planter designed so that a wheelchair-bound practitioner may access the planter and tend to plants. The planter is readily assembled from pieces that can be supplied to consumers in the form of a kit. The planter includes structures for illuminating, irrigating, and warming plants grown in the planter, as well as draining structures for removing excess water.

In some example embodiments of the present general inventive concept, a horticultural therapy apparatus accommodating persons using a wheelchair or other mobility devices utilized by the disabled encompasses a rounded concave vessel to hold plants and to hold growing media or mixture; and a support structure for elevating said vessel, said support structure including substantially horizontal metal support beams and substantially vertical metal support beams, said support structure including support bands on an underside of said rounded concave vessel, said vessel including design molded horizontal lips that substantially cover said substantially horizontal metal support beams, said vessel being fabricated from a thermally insulating synthetic plastic materials mix, said horizontal lips and said vertical lips having a rough surface texture adapted to inhibit slipping, said support structure elevating said vessel to such a height as to allow a person occupying a mobility device or wheelchair to approach said vessel and physically position the legs of a person and a portion of a mobility device or wheelchair substantially beneath said vessel, thereby enabling tending to activities within said vessel.

In some embodiments, the horticultural therapy apparatus includes a detachable water recycling system.

In some embodiments, the horticultural therapy apparatus further comprising a canopy.

In some embodiments, said support structure further comprises multiple legs, thereby providing safe and sturdy support.

In some embodiments, said support structure further comprises wheels at the base of said legs.

In some embodiments, said vessel is fabricated from a material selected for its resistance to liquid leeching.

In some embodiments, said vessel presents a color selected to repel insects and inhibit fungal growth, bacterial growth, and mold growth.

Example embodiments of the present general inventive concept can be achieved by a horticultural therapy apparatus accommodating persons using a wheelchair or other mobility devices utilized by the disabled, including a rounded concave vessel to hold plants and to hold growing media or mixture, said rounded concave vessel being fabricated from a thermally insulating synthetic plastic material, said thermally insulating synthetic plastic material being nonporous; and a mobile support structure to elevate said vessel, said support structure being capable of elevating said vessel to multiple elevations, said support structure enabling an operator to adjust the elevation of said vessel, said support structure including substantially horizontal metal support beams, substantially vertical metal support beams, and gussets, said substantially horizontal metal support beams, substantially vertical metal support beams, and gussets being joined by seamless continuous bead welding, said vessel including design molded horizontal lips that substantially cover said substantially horizontal metal support beams and design molded vertical lips that substantially cover said substantially vertical metal support beams, said horizontal lips and said vertical lips having a non-abrasive surface texture adapted to inhibit slipping, said support structure elevating said vessel to such a height as to allow a person occupying a mobility device or wheelchair to approach said vessel and physically position the legs of a person and a portion of a mobility device or wheelchair substantially beneath said vessel, thereby enabling tending to activities within said vessel.

In some embodiments, the horticultural therapy apparatus includes a detachable fluid recycling system.

In some embodiments, the horticultural therapy apparatus includes a canopy.

In some embodiments, said support structure further comprises multiple legs, thereby providing safe and sturdy support.

In some embodiments, said support structure further comprises locking casters at the base of said legs.

BRIEF DESCRIPTION OF THE DRAWINGS

The above-mentioned features of the invention will become more clearly understood from the following detailed description of the invention read together with the drawings in which.

DETAILED DESCRIPTION OF THE INVENTION

The present invention provides a wheelchair-accessible horticultural therapy apparatus. In many embodiments, the invention also incorporates illuminating, irrigating and heating structures. In many embodiments, the invention is supplied to practitioners as parts in a kit. The practitioner then easily, quickly and inexpensively assembles the apparatus with the improvements already installed in an apparatus specially designed to integrate all of these structures.

Figure 1:
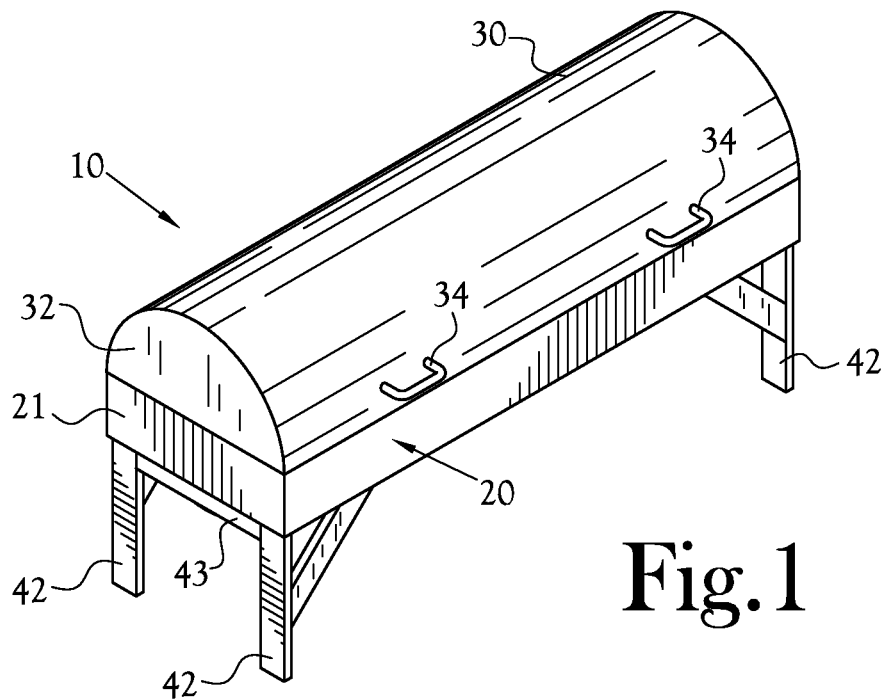
FIG. 1 is a perspective view of one embodiment of the invention, showing a planter with its canopy in the "closed" position.

One embodiment of the invention includes a planter with a retractable canopy. Referring initially to FIG. 1, a planter is indicated generally at 10. The planter includes a substantially tubular trough 20 and a canopy 30. The canopy 30 lies on top of the trough 20. In one embodiment, the trough 20 and canopy 30 together constitute a cylindrical structure when the canopy 30 is in the "closed" position, resting atop and covering the trough 20. End walls 22 for the trough 20 and similar end walls 32 for the canopy 30 provide the substantially flat (non-curving) faces of the cylinder. The trough 20 normally is fabricated from plastic, a light-weight metal, or a similar substance of sufficient structural strength to support and contain plants and soil or other growth media. In some embodiments, the canopy 30 is fabricated from a translucent material so as to admit sunlight, as with the walls of a greenhouse.

Figure 2:
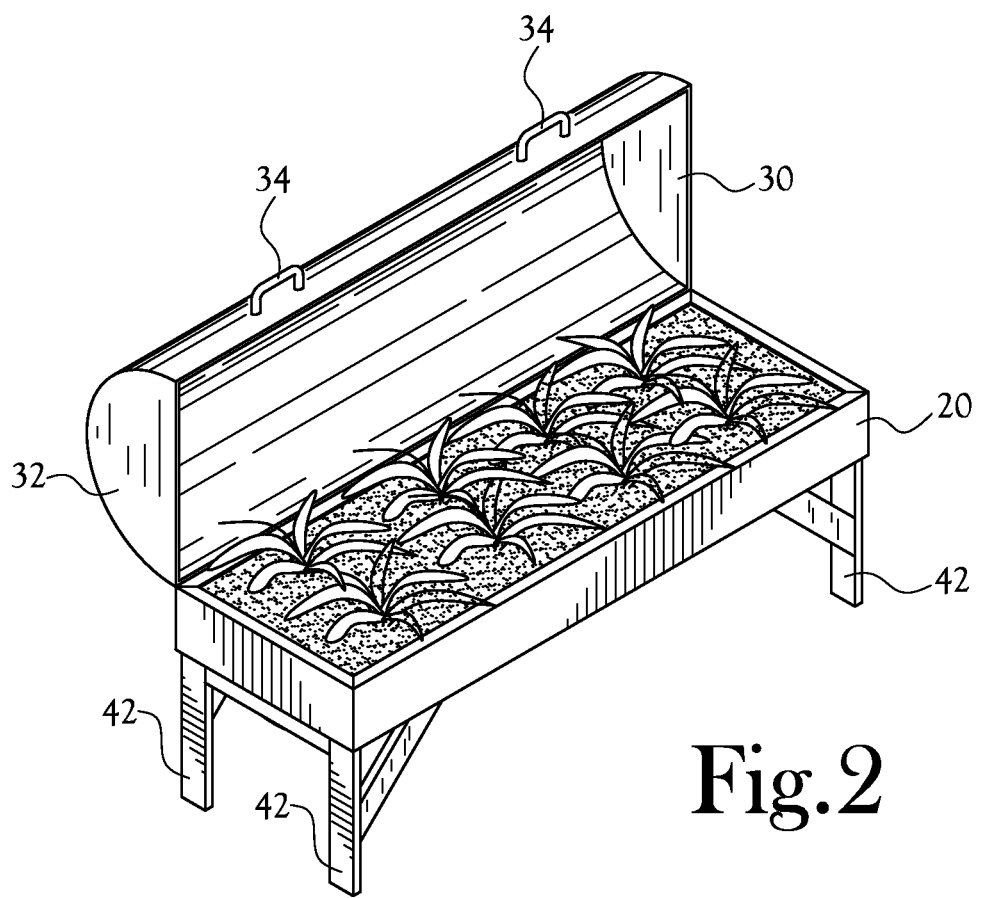
FIG. 2 is a perspective view of one embodiment of the invention, showing the planter with its canopy in the raised or "open" position, revealing the plants growing in the trough.
Figure 3:
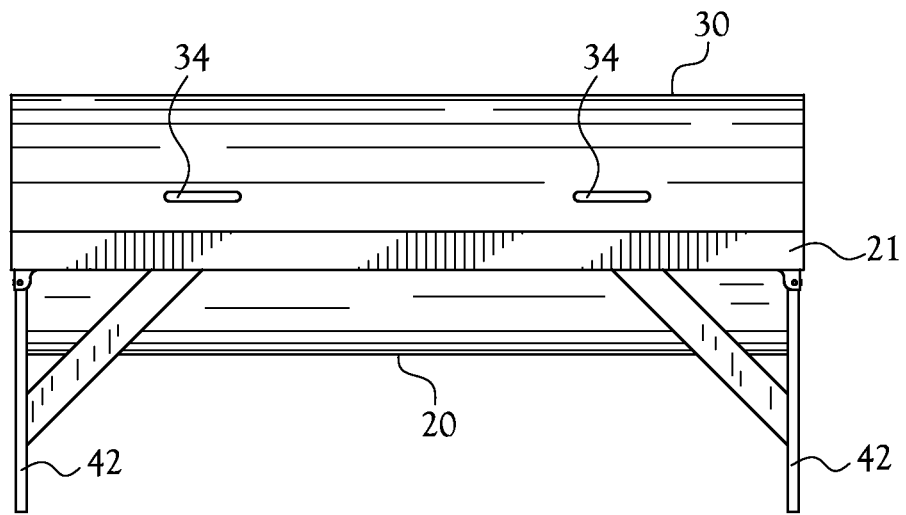
FIG. 3 is an elevation view of one embodiment of the invention.
Figure 4:
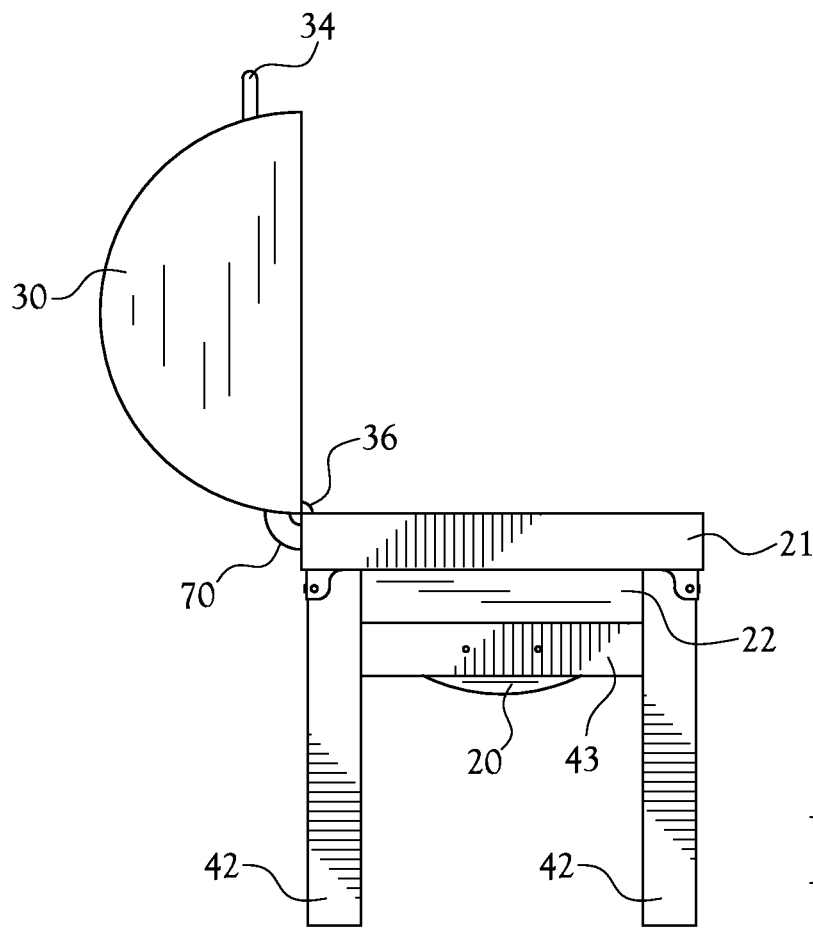
FIG. 4 is an elevation view from one end of the planter, showing the canopy raised on hinges in the open position.

Referring to FIG. 2, it is seen that the canopy 30 retracts to reveal plants growing in media in the trough 20. As seen in FIGS. 1 and 3, one or more handles 34 on the canopy 30 assist the practitioner in raising the canopy from the "closed" position shown in FIG. 1 to the "open" position shown in FIG. 2. Referring to FIG. 4, the canopy switches between the "closed" and "open" positions by pivoting on one or more hinges 36. In the "open" position, a practitioner has access to the interior of the planter 10 and to the plants growing in the trough 20. In the "open" position, the practitioner is able to tend to the plants or to perform maintenance on the planter components. People familiar with the art will recognize that the degree to which the canopy must be raised in order for the practitioner to perform certain tasks will vary depending upon the practitioner, and therefore the degree to which the canopy is raised may vary, and so numerous "open" positions may exist.

Figure 5:
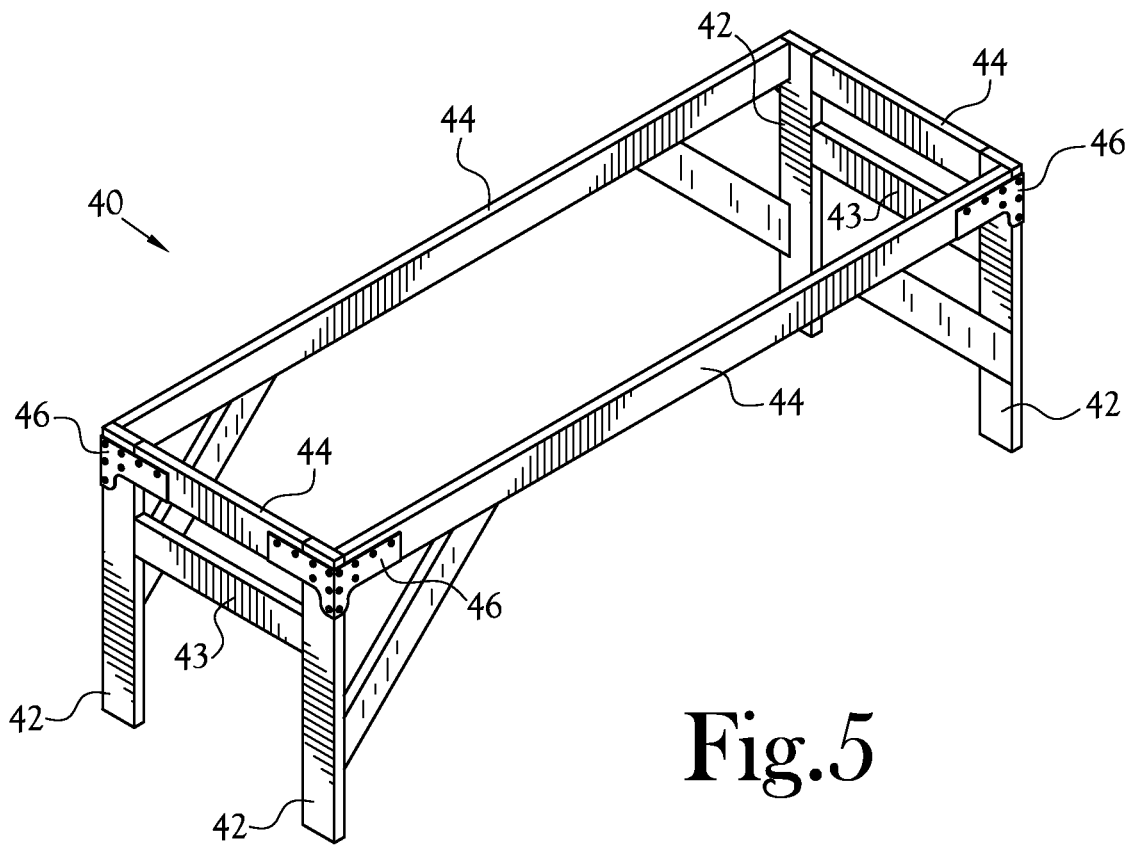
FIG. 5 is a perspective view of the planter's support apparatus, showing the brackets that secure the support apparatus.
Figure 11:
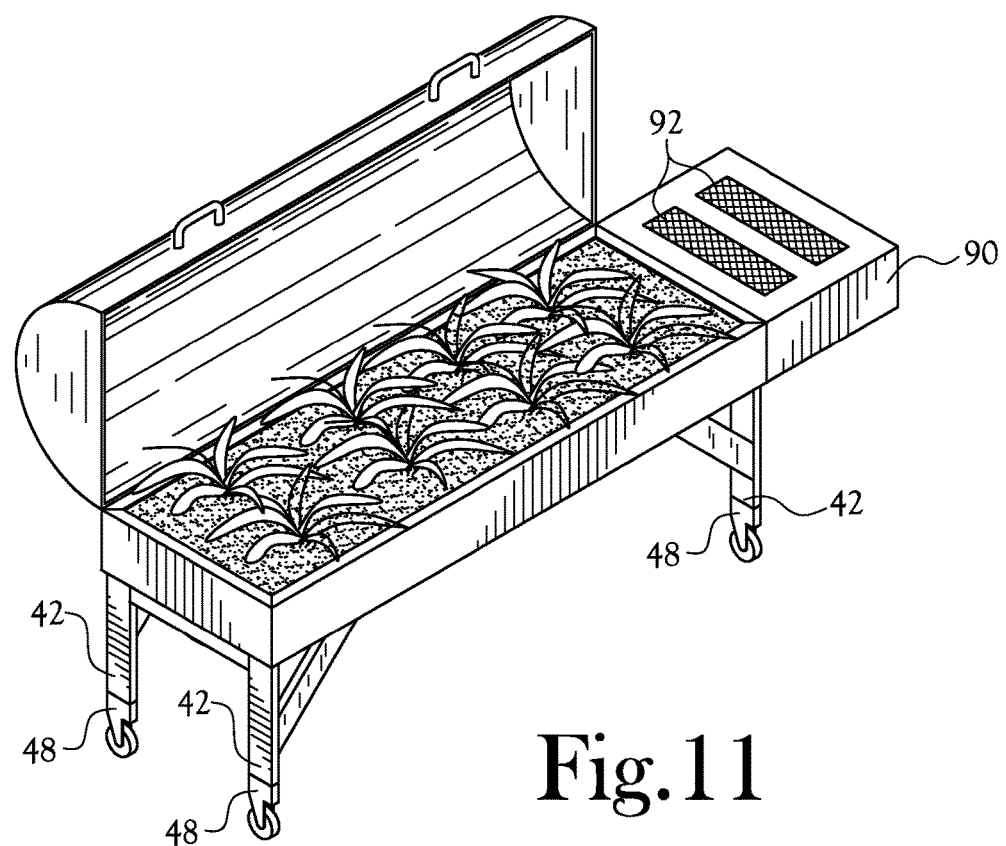
FIG. 11 is a perspective view of the planter with wheels.

Referring again to FIG. 1, the trough 20 is raised above the ground by a number of legs 42. As seen in FIG. 5, the legs 42 are part of a larger support structure 40, which supports the trough 20, canopy 30, and other components of the planter that are elevated off the ground. In one embodiment, the support structure 40, in addition to the legs 42, also includes beams 44 in a substantially horizontal orientation. The trough 20 rests upon or is otherwise connected to these beams 44. In one embodiment, the various constituent parts of the support structure 40, including the legs 42 and the beams 44, are connected and held in place by braces 46. In other embodiments, wheels or rollers 48 attached to the bases of legs make the planter more mobile, as seen in FIG. 11.

The support structure 40 elevates the trough 20 above the ground to a height such that a person occupying a wheelchair may approach the planter and position the legs of said person and a portion of the wheelchair substantially beneath the trough 20.

Figure 6:
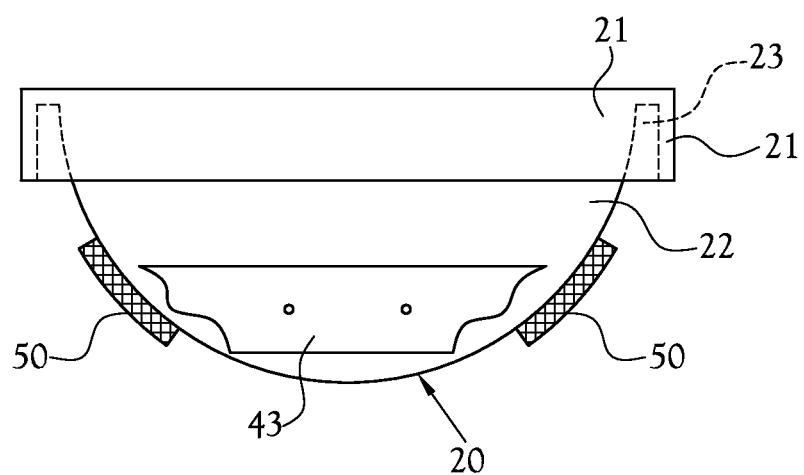
FIG. 6 is an elevation view of one end of the planter, showing a heater on one end of the planter and heaters on the underside of the trough.
Figure 7:
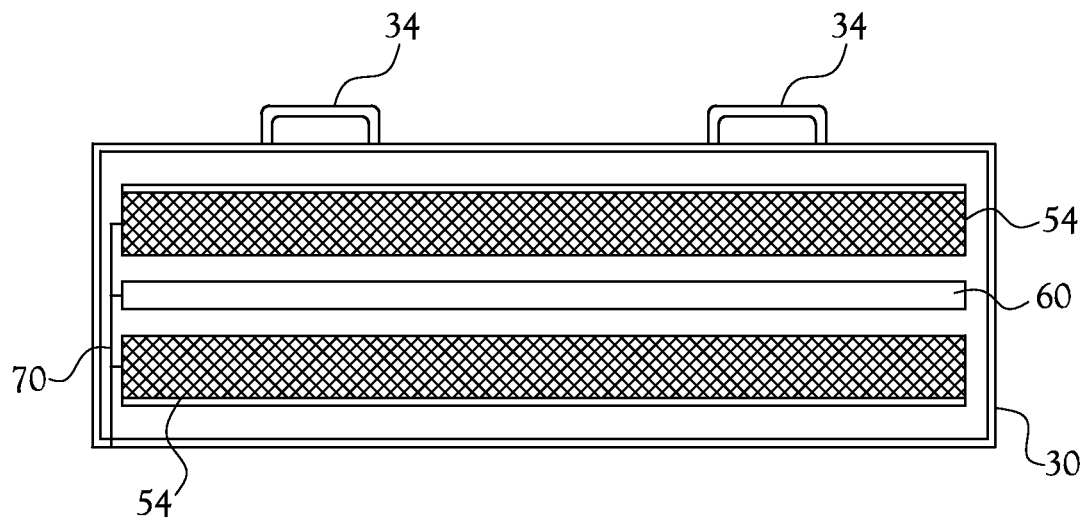
FIG. 7 is a plan view of the interior of the canopy, showing heaters and an illumination structure.

Heaters help to maintain within the planter a temperature conducive to growing plants. Referring to FIG. 6, in some embodiments heaters 50 are connected to the underside of the trough 20. In some embodiments one or more heaters 52 are also connected to the end wall 22 of the trough. Wires 70 connect the heaters to a power source. Referring to FIG. 7, in some embodiments heaters 54 are connected to the interior/underside (concave side) of the canopy 30. Wires 72 connect the canopy heaters to a power source.

A light source provides light for the plants when sunlight is not available or practicable. Referring to FIG. 7, one or more electric lamps 60 are connected to the underside of the canopy 30. The electric lamps 60 are connected to a power source through wires 70. Similar wires supply power to those electrically-powered structures connected to the trough 20. Referring to FIG. 4, said canopy wires 70 are connected to one or more wires 70 that link the canopy wires 70 to wires leading to the a power source. The wires collectively convey electrical power drawn either from an external power source or from solar panels 92, seen in FIG. 11.

Figure 10:
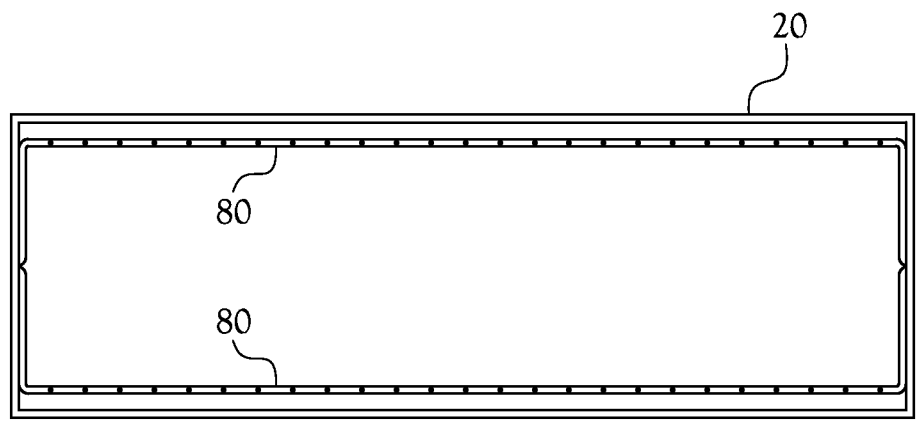
FIG. 10 is a close-up view of the irrigation pipe running along the inside rim of the trough.

Irrigation structures provide water to the plants growing within the trough 20. Referring to FIG. 10, in one embodiment, one or more tubes 80 line the rim of the trough 20. Water flows through the tubes 80, and said water is released through holes in the tubes 80 into the space where plants are growing in the trough. Referring again to FIG. 11, a pump 90 connected to the trough 20 or close nearby supplies water to the tubes 80, drawing the water from an external water source (such as a well or a garden hose connected to a residential water supply). Solar panels 92 or an external power source supply electricity to the pump 90.

Figure 8:
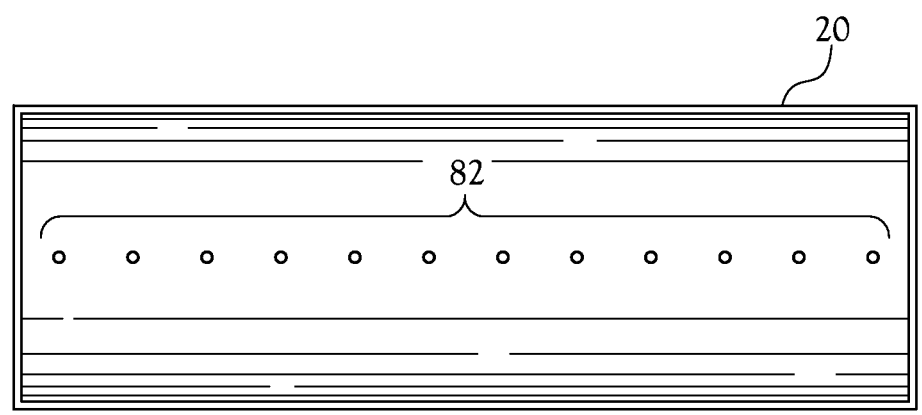
FIG. 8 is a bottom view of the planter trough, showing drainage holes.
Figure 9:
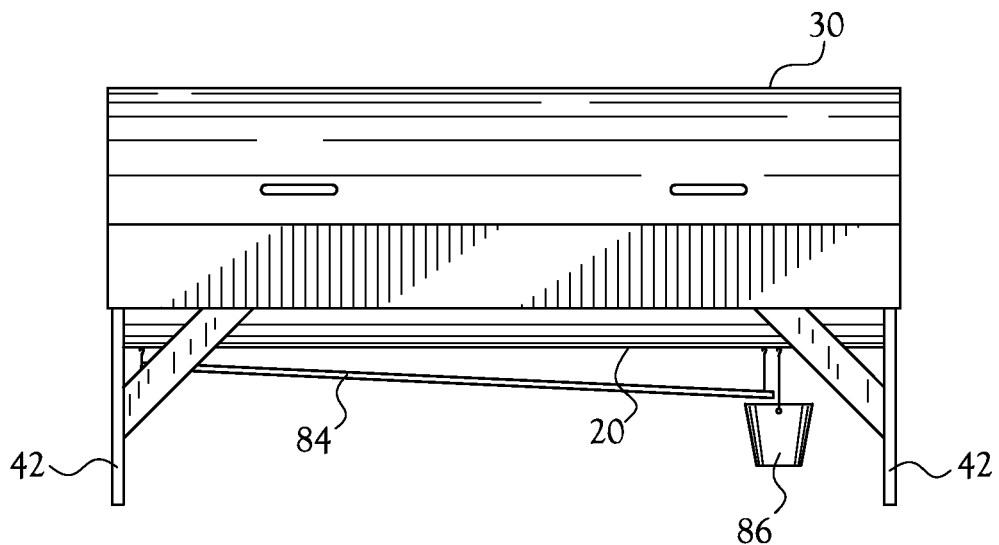
FIG. 9 is an elevation view of the planter showing a pipe along the bottom of the planter that collects water from the drainage holes and carries the water to the bucket hanging from the pipe.

Referring to FIG. 8, apertures 82 in the trough 20 allow excess water to drain from the trough. A gutter 84 suspended or positioned beneath the trough 20 collects the water flowing from the apertures 82. The gutter 84 then channels the water into a collection bucket 86 that hangs from the trough 20 or support structure 40.

As shown in FIGS. 3 and 6, in one embodiment, the depending sides 21 of the trough 20 are designed to extend over the beams 44 on opposite sides of the support structure 40. To this end, the support structure 40 is braced and the elongated beams are substantially covered by the depending sides or lips 21 on the opposite sides of the trough 20. FIG. 6 shows the opening 23 which receives the beams 44 for mounting the trough 20 on the support structure. Similarly, as shown in FIG. 4, the support structure 40 beams 44 at the opposite ends of the support structure are likewise received behind the depending lips 21 in the openings 23 defined between the end walls 22 of the trough 20 and the depending sides or lips 21 of the trough. The openings 23 (see FIG. 6) at the opposite ends of the trough are similar in cross-sectional outline to side openings 23 shown in FIG. 6. The only difference is that the end openings 23 are shorter than the side openings, and receive the end beams and side beams, respectively. By securing the opposite end walls 22 of the trough to the braces 43 at the opposite ends of the support structure, the lateral stabilization of the structure bearing the trough is enhanced.

All of the components described above can be supplied to consumers in the form of a kit, allowing a practitioner to assemble the apparatus from pieces prefabricated for inclusion in the assembled invention.

Figure 12:
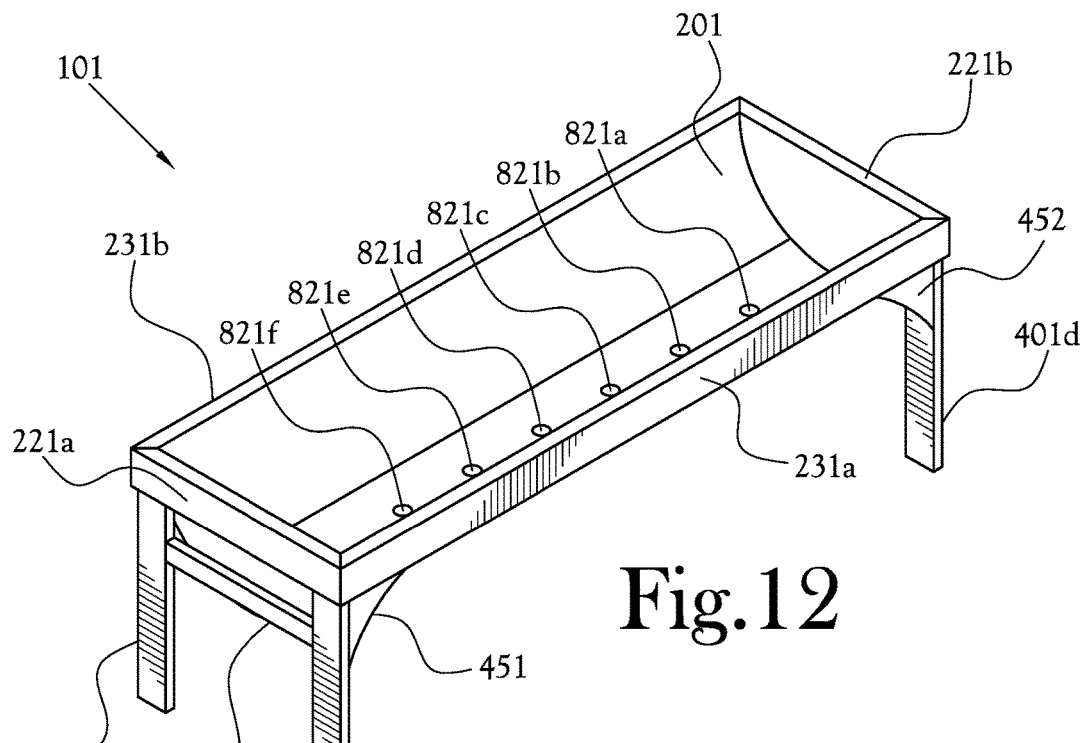
FIG. 12 is a perspective view of one embodiment of the present invention.

FIGS. 12-17 illustrate one embodiment of the present invention. As shown in FIG. 12, a horticultural therapy apparatus 101 includes a vessel 201 for holding growing media and plants; in this embodiment, the vessel 201 has a substantially rounded and concave shape, substantially like the cross-section of a cylinder cut along its axis. The vessel 201 thus has an end component and end edge at each end 221a and 221b of its longitudinal axis, as well as two side edges 231a and 231b.

Figure 13:
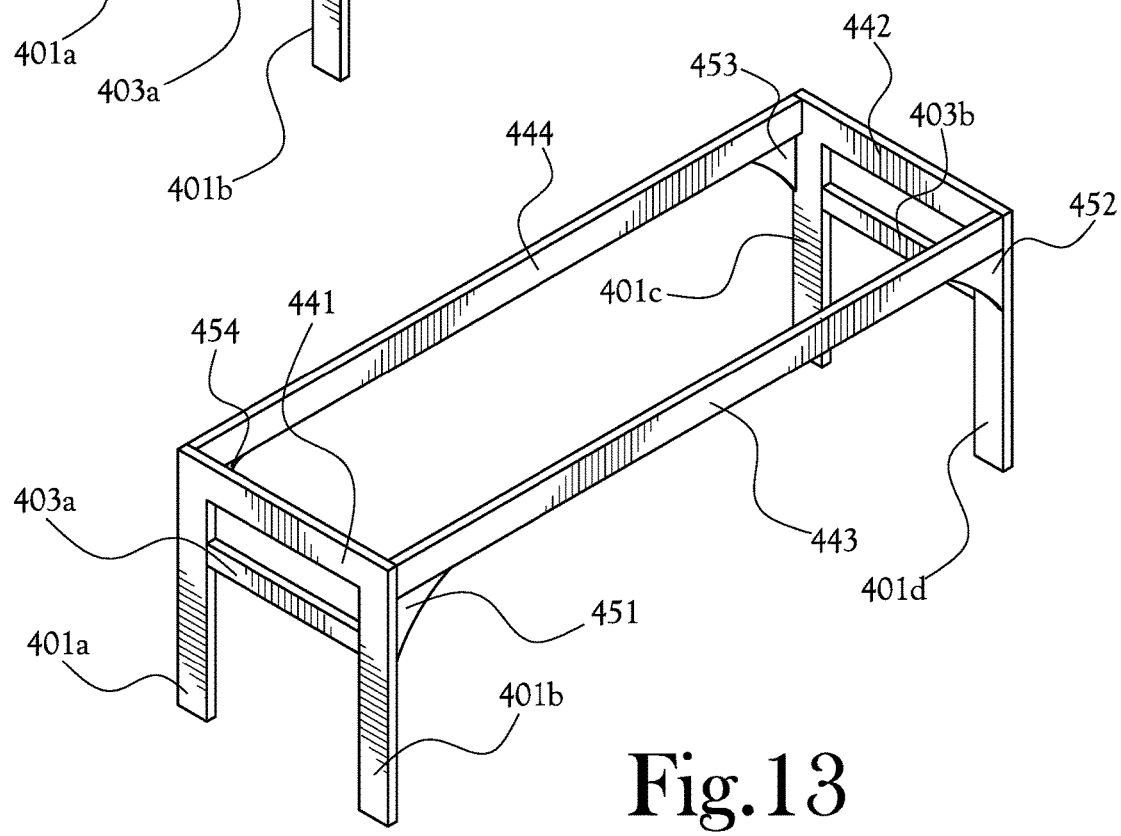
FIG. 13 is a perspective view of the support structure for the embodiment shown in FIG. 12.
Figure 14:
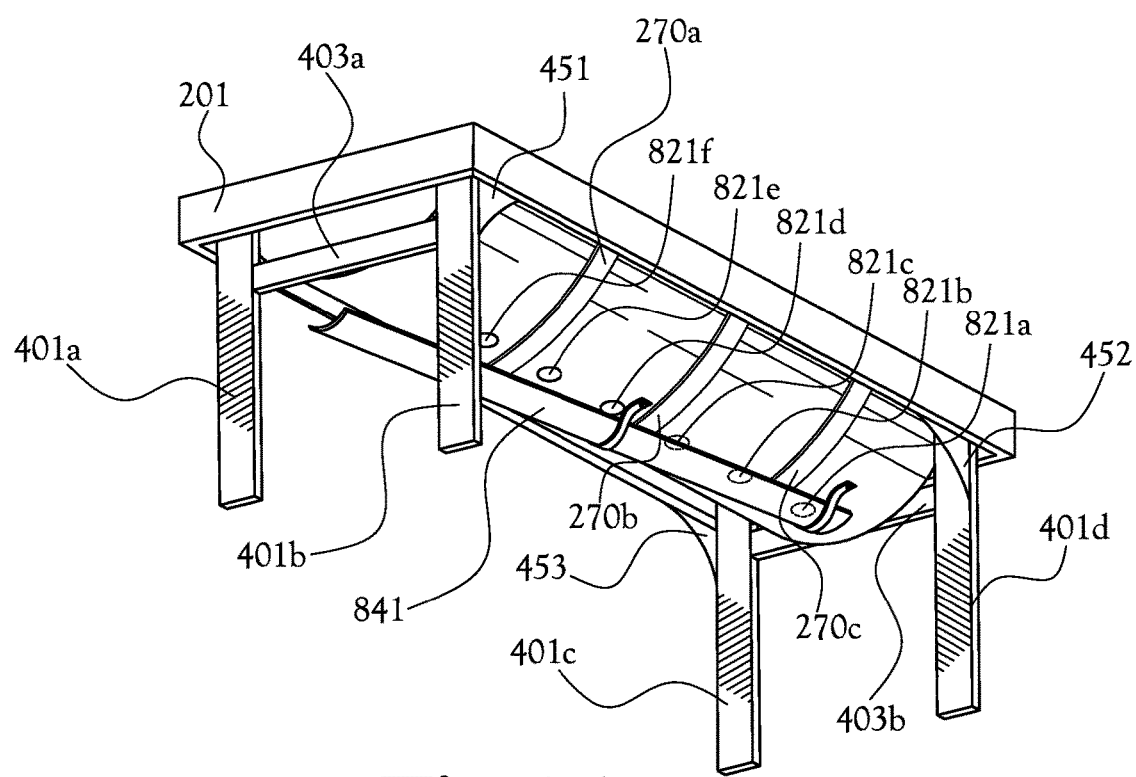
FIG. 14 is a perspective view of the embodiment shown in FIG. 12, viewed from an elevation lower than the elevation of the vessel.

The vessel 201 is supported by a support structure, shown in FIG. 13, that includes support beams 441, 442, 443, 444 onto which the vessel 201 is mounted; the support beams 441, 442, 443, 444 are supported by a number of legs 401a-d; a pair of stabilizing cross-beams 403a and 403b, one at either longitudinal end 221a and 221b, add stability to the support structure; and braces 451, 452, 453, 454 help to secure the legs 401a-d to the side support beams 443 and 444 on the side edges 231a and 231b and further enhance the stability of the support structure. Also, as seen in FIG. 14 and in the underside view in FIG. 17, a number of support bands 270a-c help to support the vessel 201. In general, the support structure elevates the vessel to a such a height as to allow a person occupying a wheelchair to approach the vessel and personally manipulate the contents of the vessel, while leaving a substantially unobstructed space beneath the vessel of sufficient size to allow a person occupying a wheelchair to approach the planter and position the legs of the person and a portion of the wheelchair substantially beneath the vessel.

Figure 15:
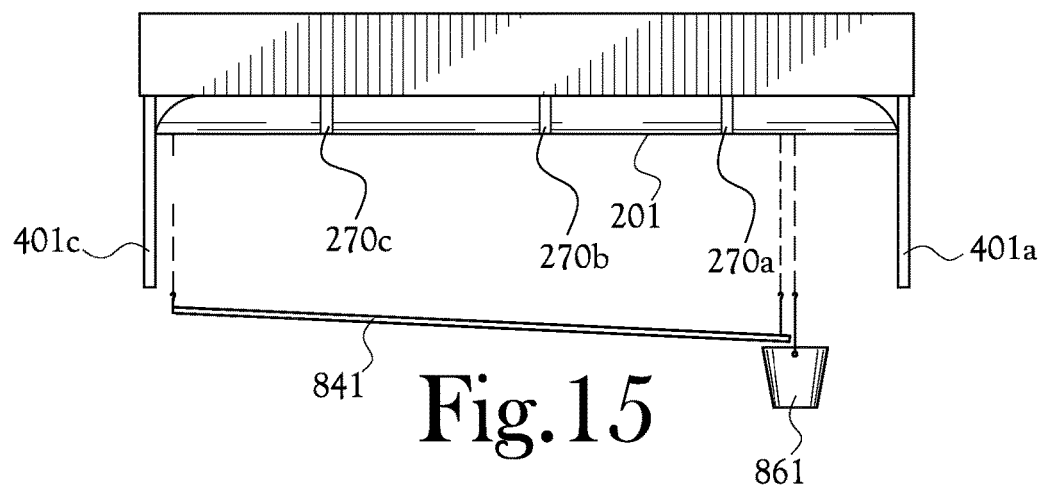
FIG. 15 is a side view of the embodiment shown in FIG. 12, showing the detachable water recovery system.

Many embodiments of the present invention include features that especially enable the apparatus for use by persons with impaired or limited mobility. In many embodiments, the four legs 401a-d, positioned at the perimeter corners of the apparatus, provide enhanced stability, so that, for example, it is unlikely that a user will tip over the vessel 201 by leaning on an edge of the vessel 201. In many embodiments, the vessel 201 includes lips 261, as seen in FIG. 15; these lips 261 substantially cover the horizontal metal support beams 441, 442, 443, 444. In many embodiments, the lips of the vessel have a rough surface texture adapted to inhibit slipping, so that when a seated person with limited upper body strength or limited motor control rests the person's forearms or elbows on the lip, the lip is not slippery and provides a stable surface for the person. In many embodiments, the edges and corners of the apparatus are rounded in order to prevent a user from becoming injured from contact with sharp edges or corners. Further, in many embodiments, the vessel is fabricated from a thermally insulating plastic that generally will not become uncomfortably hot to the touch when exposed to sunlight for prolonged periods. Further, in many embodiments, wheels or casters attached to the bases of legs make the apparatus more mobile. In many embodiments, these and other features of the apparatus collectively provide an elevated, stable and safe working surface that can be easily accessed by a person in a wheelchair or by a person otherwise operating with impaired or limited mobility.

Other features of several embodiments of the present invention help to enable growing green gardens with the apparatus. In many embodiments, the vessel 201 is fabricated from a plastic or similar material that inhibits leeching. In many embodiments, as seen in FIG. 14, the vessel includes drain apertures 821a-f that allow excess water to flow out through the bottom of the vessel 201; the water, which in many cases has absorbed many minerals and plant nutrients, then flows along a collection gutter 841 to a collection point, where, in many embodiments, it is collected in a bucket or in some other water recycling device or system (hereinafter "water recovery system") for reintroduction, when needed, to the plants in the vessel 201. As shown in FIG. 15, this water recovery system is readily detachable from the vessel 201 and the rest of the apparatus.

Figure 16A:
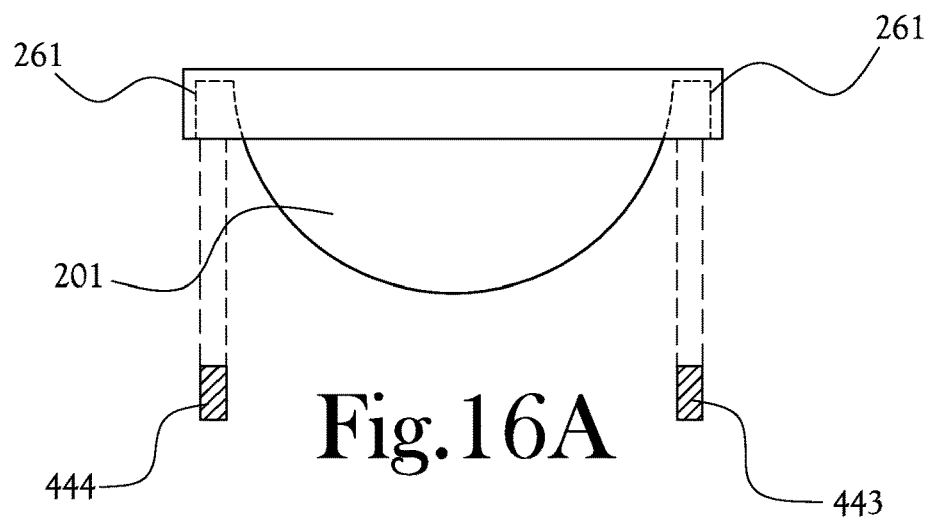
FIG. 16A is a view of the cross-section shape of the vessel of the embodiment shown in FIG. 12, showing how the shaped vessel lowers onto the beams of the support structure.
Figure 16B:
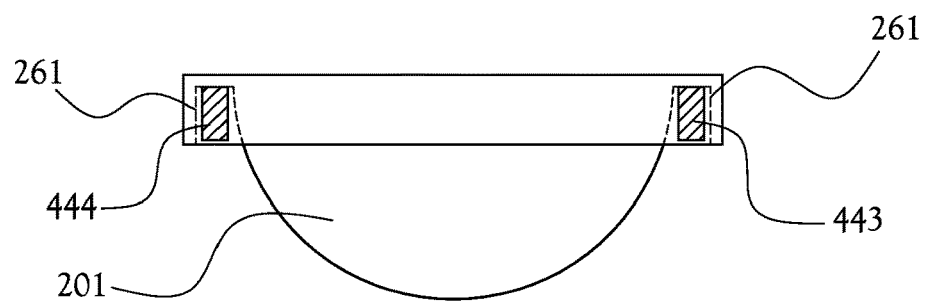
FIG. 16B is a view of the cross-section shape of the vessel of the embodiment shown in FIG. 12, showing the vessel in place after being lowered onto the beams of the support structure.
Figure 17:
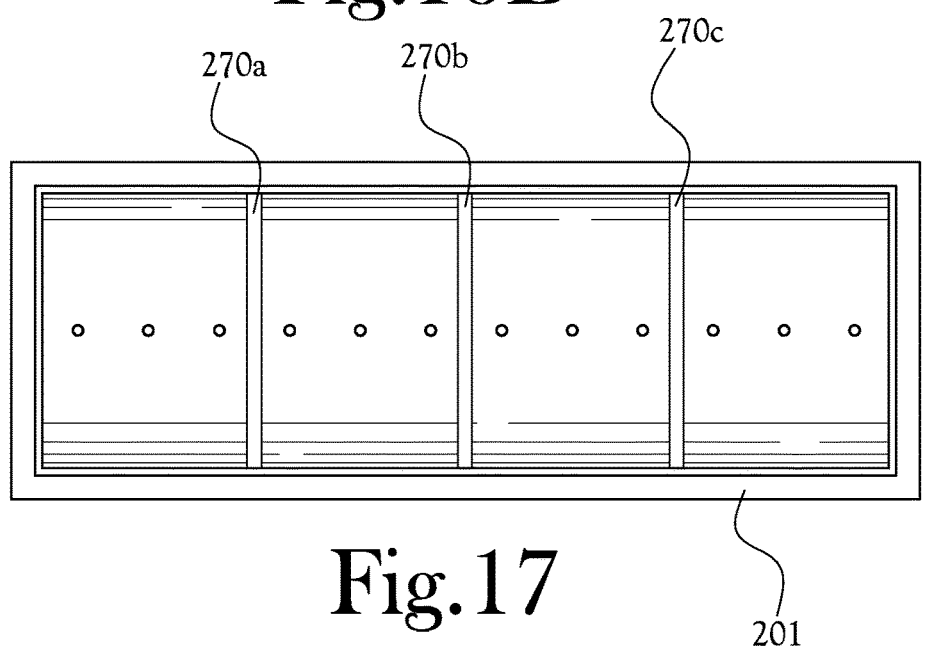
FIG. 17 is a view of the underside of the vessel of the embodiment shown in FIG. 12.

FIG. 16A is a view of the cross-section shape of the vessel 201 of the embodiment shown in FIGS. 12-17, showing how the shaped vessel 201 lowers onto the beams of the support structure 443, 444, with the lip 261 of the vessel covering the beams of the support structure; and FIG. 16B is a view of the vessel 201 in place after being lowered onto the beams of the support structure. The ease of assembly of this apparatus—with the simple lowered vessel and the vessel lip covering at least three sides of the support beams, both securing the vessel upon the support structure and protecting the beams from the elements—helps to distinguish the present general inventive concept over the prior art.

In some embodiments, the vessel 201 is red or is a color that deters insects and inhibits fungal growth.

In some of its many example embodiments, the present general inventive concept comprises a horticultural therapy apparatus primarily designed for use in an environment of physical therapy (PT), sub-classed as occupational therapy (OT), with a further refined designation, as a specialty category, of recreational therapy (RT), within which there is a highly specialized focus of horticultural therapy (HT). An HT therapy apparatus according to the present general inventive concept is highly engineered to be safe, effective, durable, and to conveniently accommodate ambulatory or impaired individuals in programmed or free-styled single or group therapy protocol. Fully functional, the HT therapy apparatus provides 100% unobstructed accessibility by wheelchair (ADA Qualified) and accommodates most other mobility devices; thus enabling the disabled and/or impaired users adequate clearance for easy positioning of legs (or prosthetic devices) beneath the perimeter of the rounded concave growing vessel. Ambulatory users find that it will easily enable and accommodate their needs by erect, seated, and/or alternate positions, without inconvenience or with minimal inconvenience.

Further, in several example embodiments of the present general inventive concept, an HT apparatus as described above is "green" qualified by design, as it incorporates a recycling system for recycling fluids, liquid nutrients, and water. Additionally, many of the material components of the HT apparatus are partially recycled. Moreover, in some embodiments, the material components of the HT apparatus inhibit undesirable attributes or conditions of use.

In some embodiments, the HT apparatus includes a canopy to cover the concave growing vessel, largely in order to protect and enhance safe plant growing (where the plants grown include plants cultivated for edible, fragrant, medicinal, and/or decorative attributes). Also, in some embodiments, the HT apparatus comprises a vessel fully supported by multiple (generally four [4]) legs, for safe, but sturdy, stable use by the ambulatory and/or impaired/handicapped people (ADA Qualified) on stable, mostly level hard flooring surfaces. In some embodiments, the HT apparatus includes locking casters at the bases of the legs, for enhanced mobility and secured stability, and for easy movability of the apparatus to various locations.

In some embodiments, an HT apparatus according to the present general inventive concept comprises a growing vessel fabricated and custom molded from a mix of extra heavy-duty marine grade materials, selected for their resistance to leeching and their ability to inhibit growth of bacteria, fungus, and mold. Additionally, the materials themselves and the colors of the materials are generally selected from materials and colors that do not attract insects.

In some embodiments, the growing media or material mix placed in the growing vessel is designed to inhibit or not support growth of bacteria, fungus, and mold.

In some example embodiments, the present general inventive concept comprises a horticultural therapy apparatus accommodating persons using a wheelchair or other mobility devices utilized by the disabled, comprising: a rounded concave vessel to hold plants and to hold growing media or mixture, said rounded concave vessel being fabricated from a thermally insulating synthetic plastic material, said thermally insulating synthetic plastic material being nonporous; and a mobile support structure to elevate said vessel, said support structure being capable of elevating said vessel to multiple elevations, said support structure enabling an operator to adjust the elevation of said vessel, said support structure including substantially horizontal metal support beams, substantially vertical metal support beams, and gussets, said substantially horizontal metal support beams, substantially vertical metal support beams, and gussets being joined by seamless continuous bead welding, said vessel including design molded horizontal lips that substantially cover said substantially horizontal metal support beams and design molded vertical lips that substantially cover said substantially vertical metal support beams, said horizontal lips and said vertical lips having a non-abrasive surface texture adapted to inhibit slipping, said support structure elevating said vessel to such a height as to allow a person occupying a mobility device or wheelchair to approach said vessel and physically position the legs of a person and a portion of a mobility device or wheelchair substantially beneath said vessel, thereby enabling tending to activities within said vessel.

Further, in some embodiments, the elevated vessel deters undesirable intrusion by animals (including vermin) and children (including infants and toddlers).

In some embodiments, a horticultural therapy apparatus comprises a fluid recycling system. Due to the recycling system's integrity and its fluid re-capture capability, liquid damage to flooring is minimized or eliminated; thus, the apparatus is usable indoors or out of doors, on flooring, decking, carpeting, tile, planking, balconies, hard packed soil, gravel, cement, and other surfaces. Applicable uses may be quite broad, and attractive.

An elevated HT apparatus according to the present general inventive concept permits a therapist and a patient to both access the vessel, simultaneously, from opposing sides of the vessel; and permits a therapist and a patient to maintain eye contact throughout.

While the present invention has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A horticultural therapy apparatus accommodating persons using a wheelchair or other mobility devices utilized by the disabled, comprising:
   a rounded concave vessel forming an elongated, semi-cylindrical interior cavity to hold plants and to hold growing media or mixture and a lip extending around an upper perimeter of the interior cavity, the interior cavity defining a central axis extending along a long dimension thereof;
   a support structure for carrying said vessel, said support structure including a plurality of substantially horizontal support beams mated to said lip and a plurality of substantially vertical support beams carrying said horizontal support beams;
   a plurality of through apertures defined by said vessel, said through apertures extending along a lower-most portion of said interior cavity and arranged in a linear configuration parallel to said central axis;
   an elongated gutter extending beneath said vessel along said long dimension of said interior cavity and aligned beneath said plurality of through apertures, said elongated gutter defining a downward slope from a first end of said gutter, proximate a first end of said vessel, to a second end of said gutter, proximate a second end of said vessel; and
   a collection bucket secured beneath said second end of said gutter, such that when water is received within said interior cavity, such water is permitted to flow downward through said apertures, along said gutter, and into said collection bucket;
   wherein said lip extends from said interior cavity over said horizontal support beams to cover each of the side surfaces of each of said horizontal support beams opposite said interior cavity, such that said horizontal support beams are received behind said lip, between said lip and said interior cavity.

2. The horticultural therapy apparatus of claim 1 wherein the collection bucket is detachable from the vessel, support structure, and gutter.

3. The horticultural therapy apparatus of claim 2 further comprising a canopy defining a semi-cylindrical interior positionable above the interior cavity of the vessel such that the interior of the canopy and the interior cavity of the vessel collectively define a cylindrical shape.

4. The horticultural therapy apparatus of claim 3 wherein said support structure further comprises wheels at the base of said vertical support members.

5. The horticultural therapy apparatus of claim 1 wherein said vessel is fabricated from plastic.

6. The horticultural therapy apparatus of claim 1 wherein said vessel is fabricated from a red plastic material, such that said vessel repels insects and inhibits fungal growth, bacterial growth, and mold growth.

7. The horticultural therapy apparatus of claim 6 wherein said lip defines a surface texture adapted to inhibit slipping of a person's arms.

* * * * *